United States Patent Office 3,426,042
Patented Feb. 4, 1969

3,426,042
ORGANIC CYCLIC CARBONATES
Fritz Hostettler and Eugene F. Cox, Charleston, W. Va., assignors to Union Carbide Corporation, a corporation of New York
No Drawing. Filed Sept. 26, 1963, Ser. No. 311,622
U.S. Cl 260—340.2          5 Claims
Int. Cl. C07d 15/04; C08g 17/13

This invention relates to the preparation of cyclic carbonate compounds. In various aspects, the invention relates to processes for producing said cyclic carbonate compounds.

The novel cyclic carbonate compounds which are contemplated can be characterized by the following formula

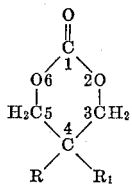

wherein R can be nitro (—NO$_2$) or tertiary amino

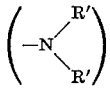

each R', individually, being a monovalent hydrocarbon radical, e.g., alkyl, cycloalkyl, aralkyl, alkenyl, cycloalkenyl, and the like; and wherein R$_1$ can be acyloxymethyl, e.g., alkanoyloxymethyl, alkenoyloxymethyl, alkadienoyloxymethyl, alkatrienoyloxymethyl, arylcarbonyloxymethyl, and the like. It is preferred that R be a nitro radical. It is also preferred that R and R$_1$ radicals, individually, contain no more than 12 carbon atoms each.

Illustrative R radicals include, among others, the dialkylaminos, preferably the lower dialkylaminos, e.g., dimethylamino, diethylamino, diisopropylamino, di-n-butylamino, di-sec-butylamino, di-t-butylamino, diisobutylamino, di-2-ethylhexylamino, didodecylamino, dioctadecylamino, and the like; the dicycloalkylaminos, especially those which contain from 5 to 6 carbon atoms in the cycloaliphatic nucleus, e.g., dicyclopentylamino, dicyclohexylamino, di(lower alkyl-substituted cyclohexyl)amino, and the like; diallylamino; dicrotylamino; and the like.

With further reference to Formula I supra, illustrative R$_1$ radicals include, for example, propenoyloxymethyl,
4-octenoyloxymethyl,
3-phenyl-2-propenoyloxymethyl,
ethanoyloxymethyl,
propanoyloxymethyl,
butanoyloxymethyl,
hexanoyloxymethyl,
octanoyloxymethyl,
benzoyloxymethyl,
cinnamoyloxymethyl,
phenylethanoyloxymethyl,
cyclohexanecarbonyloxymethyl,
cyclohexenecarbonyloxymethyl,
2,4-hexadienoyloxymethyl,
linoleoyloxymethyl,
oleoyloxymethyl,
linolenoyloxymethyl, and the like.

Exemplary classes of novel cyclic carbonate compounds include 4-nitro-4-alkenoyloxymethyl-2,6-dioxacyclohexanone,
4-dialkylamino-4-alkenoyloxymethyl-2,6-dioxacyclohexanone,
4-nitro-4-alkanoyloxymethyl-2,6-dioxacyclohexanone,
4-dialkylamino-4-alkanoyloxymethyl-2,6-dioxacyclohexanone,
4-nitro-4-arylcarbonyloxymethyl-2,6-dioxacyclohexanone,
4-nitro-4-cycloalkanecarbonyloxymethyl-2,6-dioxacyclohexanone,
4-nitro-4-arylalkanoyloxymethyl-2,6-dioxacyclohexanone,
4-nitro-4-alkadienoyloxymethyl-2,6-dioxacyclohexanone,
4-nitro-4-alkatrienoyloxymethyl-2,6-dioxacyclohexanone,
and the like.

Specific examples of the novel cyclic carbonate compounds include, for instance, 4-nitro-4-ethanoyloxymethyl-2,6-dioxacyclohexanone,
4-nitro-4-propanoyloxymethyl-2,6-dioxacyclohexanone,
4-nitro-4-butanoyloxymethyl-2,6-dioxacyclohexanone,
4-nitro-4-propenoyloxymethyl-2,6-dioxacyclohexanone,
4-nitro-4-(2-butenoyloxymethyl)-2,6-dioxacyclohexanone,
4-nitro-4-(3-butenoyloxymethyl)-2,6-dioxacyclohexanone,
4-nitro-4-(5-hexenoyloxymethyl)-2,6-dioxacyclohexanone,
4-nitro-4-cyclohexanecarbonyloxymethyl-2,6-dioxacyclohexanone,
4-nitro-4-benzoyloxymethyl-2,6-dioxacyclohexanone,
4-nitro-4-phenylethanoyloxymethyl-2,6-dioxacyclohexanone,
4-dimethylamino-4-propenoyloxymethyl-2,6-dioxacyclohexanone,
4-diethylamino-4-propenoyloxymethyl-2,6-dioxacyclohexanone,
4-diisopropylamino-4-propenoyloxymethyl-2,6-dioxacyclohexanone,
4-dibutylamino-4-propenoyloxymethyl-2,6-dioxacyclohexanone,
4-nitro-4-hexadienoyloxymethyl-2,6-dioxacyclohexanone,
4-nitro-4-linoleoyloxymethyl-2,6-dioxacyclohexanone,
4-nitro-4-oleoyloxymethyl-2,6-dioxacyclohexanone,
4-nitro-4-linolenoyloxymethyl-2,6-dioxacyclohexanone, and the like.

The preparation of 4-nitro-4-acyloxymethyl-2,6-dioxacyclohexanone is effected by the following sequence of steps:

(1)
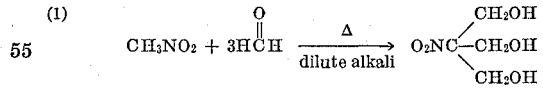

Equation 1 supra represents an aldol-like condensation reaction which can be conducted in the presence of a basic catalyst, e.g., a dilute alkali metal hydroxide solution, at an elevated temperature. The product, i.e., tris(hydroxymethyl)nitromethane, is then contacted with an acyl halide which is designated as $$R''\overset{O}{\overset{\|}{C}}X$$

in Equation 2 below:

(2)
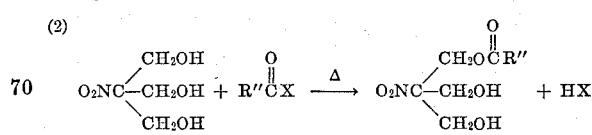

The resulting monoesterified product then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

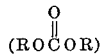

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. The disclosures of the aforesaid patents are incorporated by reference into this specification. Equation 3 infra illustrates the cyclization step whereby the nitro substituted carbonate compound is formed.

(3)

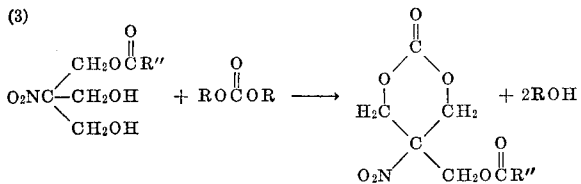

The preparation of the 4-t-amino-4-acyloxymethyl-2,6-dioxacyclohexanones can be accomplished by contacting the monoesterified product of Equation 2 supra with hydrogen, in the presence of conventional hydrogenation catalysts, e.g., Raney nickel, platinum, and the like, at an elevated temperature, e.g., from about 50° C. to about 200° C., followed by reacting the resulting amino substituted monoesterified product with a stoichiometric excess of a hydrocarbyl halide (R'''X), and then cyclizing the tertiary amino product as illustrated in Equation 3 supra.

(4)

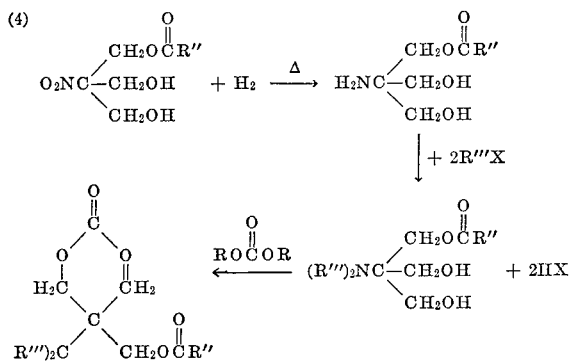

The novel ethylenically unsaturated cyclic carbonates of Formula I can be homopolymerized through the ethylenic group, or these novel carbonates can be copolymerized with other ethylenically unsaturated carbonate(s) or with other ethylenically unsaturated organic compound(s) (described hereinafter and termed "vinyl monomer," for brevity) through their ethylenic groups, preferably in the presence of a peroxide catalyst (described hereinafter), to give linear solid polymeric products which have utility in the molding, laminating, and coating arts, e.g., manufacture of plastic toys which can be rigid or flexible, paper weights, inkstands, etc.

Among the vinyl monomers which are contemplated are those which contain a polymerizable ethylenic bond. Illustrative vinyl monomers include, for example, styrene, alkylstyrene, chlorostyrene, ethylstyrene, dimethylstyrene, isopropylstyrene, divinylbenzene, alkyl acrylate, alkyl methacrylate, alkyl, crotonate, methyl acrylate, ethyl acrylate, n-propyl acrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The peroxide catalysts which can be employed include, for instance, benzoyl peroxide, methyl ethyl ketone peroxide, methyl isobutyl ketone peroxide, p-methane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like.

The operative conditions, e.g., temperature and pressure, are of the order employed in the vinyl-type polymerization arts, e.g., 75°–150° C.

The novel saturated as well as the ethylenically unsaturated cyclic carbonates of Formula I can be homopolymerized or copolymerized through the carbonate group, in the presence of catalysts such as n-butyllithium, di-n-butylzinc, and triisobutyl-aluminum, at a temperature of from about 0° to about 200° C., and for a period of time sufficient to produce high molecular weight solid products. The solid products which lack ethylenic unsaturation can be used in the moldings and laminating arts, for the manufacture of toys, paper weights, skis, and the like. The solid products which contain a plurality of pendant groups having ethylenic sites can be cured via procedures well recognized in the synthetic and natural rubber arts, e.g., sulfur cure, to give tough and/or rubbery and/or elastomeric products. These products are useful as gaskets, seals, flexible films, specialty tires, and the like.

The novel cyclic carbonate compounds of Formula I supra which contain ethylenic unsaturation can be contacted with an organic peracid to produce the corresponding vicinal epoxides. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. The ultimate epoxide product will depend upon the number of ethylenic bonds present in the cyclic carbonate reactant and the amount of peracid employed. Thus, substantial conversion of a monoethylenically unsaturated cyclic carbonate compound to the corresponding vicinal-epoxy cyclic carbonate compound is favored or accomplished by employing at least one mol of peracid per mol of said monoethylenically unsaturated cyclic carbonate, e.g., from about 1.0 to about 10 mols of peracid per mol of said carbonate. By way of a second illustration, if the cyclic carbonate contains two carbon to carbon double bonds, then substantial conversion occurs by employing at least two mols of peracid per mol of diethylenically unsaturated cyclic carbonate. In general, then, the number of mols of peracid per mol of carbonate reactant which should be employed to effect essentially complete epoxidation is at least equal to, and generally greater than, the number of ethylenic sites contained in said carbonate reactant. When a polyethylenically unsaturated cyclic carbonate reactant is employed, one can also obtain a cyclic carbonate product which contains an ethylenic group(s) as well as a vicinal-epoxy(s) by employing, for example, equimolar quantities of the carbonate and peracid reactants, and, more desirably still, by employing a molar excess of the carbonate reactant in relation to the peracid. In general, the epoxidation reaction is conducted for a period of time which is sufficient to introduce oxirane oxygen at the desired number of ethylenic sites in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic carbonate product.

The vicinal-epoxy cyclic carbonate compounds are novel and useful. They can be characterized by the following formula:

II

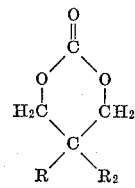

wherein R has the same values as the variable R of Formula I supra, and wherein $R_2$ is equal to the partially or completely epoxidized moieties of $R_1$ of Formula I supra, for example, vicinal-epoxyalkyl, vicinal-epoxycycloalkyl, vicinal-epoxyalkanoyloxymethyl, vicinal-epoxyalkenoyloxymethyl, di(vicinal - epoxy)akanoyloxymethyl, vicinal-epoxyalkadienoyloxymethyl, di(vicinal-epoxy)alkenoyloxymethyl, tri(vicinal - epoxy)alkanoyloxymethyl, vicinal - epoxycycloalkanecarbonyloxymethyl, and the like. The $R_2$ variables of Formula II supra are fully illustrated by merely substituting oxirane oxygen for one of the bonds in the carbon to carbon ethylenic unsaturation, i.e., converting

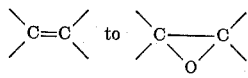

of the $R_1$ variables of Formula I supra.

The vicinal-epoxy cyclic carbonate compounds of Formula II can be homopolymerized, or these novel vicinal-epoxy cyclic carbonates can be copolymerized with other vicinal-epoxy cyclic carbonates or with other mono- or polyepoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono-, and polyepoxides which are contemplated include, among others, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3 - epoxycyclopentyl) ether, butadiene dioxide, phenyl glycidyl ether, 1,2-epoxydodecane, and the like.

In addition, the novel vicinal-epoxy cyclic carbonates of Formula II with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coating, molding, and encapsulating arts.

The vicinal-epoxy cyclic carbonates of Formula II are also useful as plasticizers for polyvinyl chloride compositions.

The following examples are illustrative:

EXAMPLE 1

(A) To a reaction flask equipped with stirrer, azeotrope heat, and thermometer there are charged 2 mols of tris(hydroxymethyl)nitromethane, 1 mol of acetic acid, 500 milliliters of benzene, and 0.01 mol of concentrated sulfuric acid. The reactants are heated to reflux and the resulting water is removed continuously by means of the azeotope head. The reaction is essentially complete in 8 hours. The benzene is then removed via distillation and the resulting residue is subjected to vacuum distillation at 1 mm. Hg. The desired product, 2-nitro-2-acetoxymethyl-1,3-propanediol is separated from tris(hydroxymethyl)nitromethane by this distillation procedure. Redistillation of the ester under reduced pressure at 1 mm. Hg gives essentially pure 2-nitro-2-acetoxymethyl-1,3-propanediol, as confirmed by elemental analysis. The product is a crystalline solid.

(B) To a reaction flask equipped with stirrer, thermometer, and Dry-Ice condenser, there is charged 0.5 mol of 2-nitro-2-acetoxymethyl-1,3-propanediol, one mole of triethylamine, and 750 milliliters of toluene. The reactants are cooled to 0-5° C. One-half mol of phosgene is then added gradually to the reaction flask at a temperature not exceeding 15° C. After completion of the phosgene addition, the mixture is allowed to warm to room temperature. The amine hydrochloride is removed by filtration and the toluene filtrate is set aside. A substantial amount of the carbonate remains in the hydrochloride and is recovered by extraction with acetone. The toluene solution and the acetone extract are combined and the solvents are removed in vacuo. The resulting syrup is the crude carbonate. It is purified by rapid distillation at 150-170° C. at a pressure of 1-3 mm. Hg. Further purification by distillation at 1 mm. Hg results in a solid product, namely, 4-nitro-4-acetoxymethyl-2,6-dioxacyclohexanone. Examination of the infrared spectrum, analysis for the carbonate and acetoxy groups, and elemental analysis are consistent with the molecular structure of the subject carbonate.

EXAMPLE 2

(A) To a reactor flask equipped with stirrer, thermometer, and distillation column, there is charged 2 mols of tris(hydroxymethyl)nitromethane, one mol of methyl acrylate, 500 milliliters of toluene, 0.5 g. of hydroquinone, and 0.3 g. of sodium. The reactants are heated to about 100° C. and over a period of 3 hours the resulting co-product methanol is removed via distillation. After removal of the toluene in vacuo, the resulting nitroester is separated from tris(hydroxymethyl)nitromethane by distillation at 0.5 mm. Hg. The distillate is stabilized against polymerization by addition of 0.1 percent hydroquinone. Redistillation of the crude ester at a pressure of 0.5 mm. Hg results in a solid product, 2-nitro-2-propenoyloxymethyl-1,3-propanediol, as confirmed by elemental analy-sis.

(B) According to the procedure set forth in Example 1B there is reacted 0.5 mol of 2-nitro-2-propenoyloxymethyl-1,3-propanediol (stabilized with 0.1 percent hydroquinone) with phosgene. The cycle carbonate is recovered as exemplified in Example 1B supra and is further rectified by distillation at 0.5 mm. Hg. The resulting product, 4-nitro-4-propenoyloxymethyl-2,6-dioxacyclohexanone, is stabilized against vinyl polymerization by addition of 0.1 percent hydroquinone. Examination of the crystalline product by infrared analysis and elemental analysis is consistent with its chemical structure.

EXAMPLE 3

(A) According to the procedure set forth in Example 1A there is reacted 2 mols of tris(hydroxymethyl)nitromethane, and one mol of oleic acid. The resulting oleic acid ester is recovered by distillation at a pressure of about $10^{-3}$ mm. Hg. Further purification by redistillation yields the desired liquid compound, 2-nitro-2-oleoyloxymethyl-1,3-propanediol as confirmed by elemental analysis.

(B) To a reaction flask equipped with a stirrer, thermometer, and distillation column, there is charged 0.25 mol of 2-nitro-2-oleoyloxymethyl-1,3-propanediol and reacted with phosgene as set forth in Example 1B. The product is recovered by rapid distillation at 160–180° C. and $10^{-5}$ mm. Hg. Further purification by redistillation at $10^{-5}$ mm. Hg results in a viscous liquid, namely, 4-nitro-oleoyloxymethyl-2,6-dioxacyclohexanone. Examination of the infrared spectrum, and elemental analysis are consistent with the molecular structure of the subject carbonate.

EXAMPLE 4

(A) Two mols of tris(hydroxymethyl)nitromethane, 6 mols of acetaldehyde, 300 mililiters of glacial acetic acid, 1700 mililiters of ethanol, and 50 g. of Raney nickel are charged to a hydrogenation autoclave. Said reactants are heated to 70° C. and 25–50 p.s.i. of hydrogen pressure is applied until hydrogen uptake is essentially complete. After discharge of the resulting mixture, the catalyst is removed by filtration and the filtrate is made alkaline by addition of 30 percent sodium hydroxide. The ethanol is now removed via distillation. The ethylated amine is removed by filtration and the filtrate is made alkaline by tion with ethyl ether for a period of 48 hours. The resulting extract is evaporated to remove ethyl ether and the residue is subjected to distillation at 0.5 mm. Hg. Further rectification at 0.3–0.5 mm. Hg results in essentially pure tris(hydroxymethyl)-N,N-diethylaminomethane as confirmed by elemental analysis.

(B) To a reaction flask are charged 1.5 mols of tris(hydroxymethyl)-N,N-diethylaminomethane, and 0.5 mol of sodium hydroxide (25 percent aqueous solution). The reactant mixture is cooled to 0° C., and 0.5 mol of propanoyl-chloride is added while the reactant mixture is thoroughly agitated. After completion of the reaction, the resulting product mixture is separated from the aqueous phase by continuous extraction with ethyl ether for a period of 24 hours. The resulting ether extract is dried over anhydrous sodium sulfate and after filtration the ether is removed by evaporation. The residue ester is subjected to fractional distillation at 0.5–1 mm. Hg. Rectification of the desired product, 2-(N,N-diethylamino)-2-propanoyloxymethyl-1,3-propanediol is accomplished by further distillation at 0.5 mm. Hg. Elemental analysis of the product shows that it is substantially pure.

(C) To a flask equipped with stirrer, thermometer, and distillation column, there is charged 0.2 mol of 2-(N,N-diethylamino) - 2 - propanoyloxymethyl - 1,3-propanediol, 0.3 mol of diethyl carbonate, and 0.1 g. sodium. The reactant mixture is heated to about 100° C., and over a period of one hour the resulting ethanol co-product is removed via distillation. After removal of excess diethyl carbonate in vacuo, the pot temperature is increased to 150° C., and the resulting cyclic carbonate is recovered by distillation at 1–3 mm. Hg. Further purification by distillation at 1 mm. Hg results in the subject carbonate, namely, 4-(N,N-diethylamino)-4-propanolyloxymethyl-2,6 - dioxacyclohexanone. Examination of the subject compound by means of infrared analysis, and elemental analysis is consistent with its structure.

EXAMPLE 5

(A) To a reaction flask there is charged 2 mols of tris-(hydroxymethyl)aminomethane, 750 milliliters of water, and 4 mols of sodium hydroxide. After the above ingredients are dissolved, 4 mols of allyl chloride are added dropwise while the temperature is not allowed to exceed 60° C. After completion of the addition the reactant mixture is held for an additional 2 hours at 60° C. The mixture is then cooled to room temperature and the organic amines are separated from the aqueous phase by continuous extraction with ethyl ether for a period of 48 hours. The ether extract is evaporated and the alkyl amines are separated by distillation at 0.5 mm. Hg. The desired solid product, tris - (hydroxymethyl)-N,N-diallylaminomethane is identified by elemental analysis.

(B) To a reaction flask are charged one mol of tris-(hydroxymethyl)-N,N-diallylaminomethane and 0.33 mol of sodium hydroxide (as a 25 percent aqueous solution). The reactant mixture is cooled to 0° C., and 0.33 mol of benzoylchloride is added while agitating thoroughly. After completion of the reaction, the resulting organic ester is separated from the aqueous phase by continuous extraction with ethyl ether for a period of 24 hours. The resulting ether extract is dried over anhydrous sodium sulfate and after filtration the ether is removed via distillation. The residue ester is subjected to fractional distillation at $10^{-2}$ mm. Hg. Further rectification of the desired product, 2-N,N-diallylamino-2-benzoyloxymethyl-1,3-propanediol is accomplished by an additional distillation at about $10^{-3}$ mm. Hg. Elemental analysis of the product and determination of the saponification equivalent show that the product is essentially pure.

(C) To a flask equipped with stirrer, thermometer, and distillation column, there is charged 0.25 mol of 2-N,N-diallylamino-2-benzoyloxymethyl - 1,3 - propanediol, 0.4 mol of diethyl carbonate, and 0.15 g. of sodium. The reactant mixture is heated to about 100° C., and over a period of one hour, the resulting ethanol co-product is removed via distillation. After removal of excess diethyl carbonate in vacuo, the pot temperature is increased to 160° C., and the resulting cyclic carbonate is recovered by distillation at about 0.5 mm. Hg. Further rectification by distillation at about $10^{-3}$ mm. Hg results in the subject carbonate, namely, 4-(N,N-diallylamino)-4-benzoyloxymethyl-2,6 - dioxacyclohexanone. Examination of the subject carbonate by means of infrared analysis, and by elemental analysis is consistent with its structure.

What is claimed is:

1. A compound of the formula

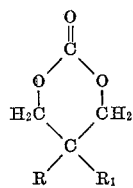

wherein R is nitro and wherein $R_1$ is of the group consisting of (a) alkanoyloxymethyl having up to 12 carbon atoms, (b) oleoyloxymethyl, and (c) linoleoyloxymethyl.

2. 4-nitro-4-alkanoyloxymethyl-2,6-dioxacyclohexanone, the alkanoyloxymethyl moiety of which contains up to 12 carbon atoms.

3. 4-nitro-4-linolenoyloxymethyl-2,6-dioxacyclohexanone.

4. 4-(N,N-diethylamino)-4-propanoyloxymethyl-2,6-dioxacyclohexanone.

5. 4-nitro-4-oleoyloxymethyl-2,6-dioxacyclohexanone.

References Cited

UNITED STATES PATENTS 2,924,607  2/1960  Pattison _____ 260—340.2 X

NORMA S. MILESTONE, *Primary Examiner.*

U.S. Cl. X.R.

260—77.5, 469, 486, 488, 584, 635